(12) United States Patent
Malloy Desormeaux

(10) Patent No.: US 6,353,712 B1
(45) Date of Patent: Mar. 5, 2002

(54) DUAL FILM IMAGE AND ELECTRONIC IMAGE CAPTURE CAMERA WITH SELF-TIMER

(75) Inventor: Stephen G. Malloy Desormeaux, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/521,366

(22) Filed: Mar. 8, 2000

(51) Int. Cl.[7] ............................................... G03B 17/18
(52) U.S. Cl. ........................... 396/287; 396/429; 348/64
(58) Field of Search ................................. 396/429, 374, 396/264, 286, 287, 296; 348/64, 333.01, 333.11, 333.13; 358/909.1, 906

(56) References Cited

U.S. PATENT DOCUMENTS

| 4,714,962 | A | | 12/1987 | Levine | |
|---|---|---|---|---|---|
| 5,561,462 | A | * | 10/1996 | Nagano | 348/372 |
| 5,619,257 | A | * | 4/1997 | Reele et al. | 348/64 |
| 5,664,243 | A | * | 9/1997 | Okada et al. | 396/246 |
| 5,710,954 | A | | 1/1998 | Inoue | |
| 5,774,754 | A | * | 6/1998 | Ootsuka | 396/380 |
| 5,845,166 | A | * | 12/1998 | Fellegara et al. | 396/429 |
| 6,085,048 | A | * | 7/2000 | Mikoshiba et al. | 396/374 |

\* cited by examiner

*Primary Examiner*—David M. Gray
(74) *Attorney, Agent, or Firm*—Roger A. Fields

(57) ABSTRACT

A camera substantially simultaneously captures a film image of a subject being photographed and an electronic image of the subject which corresponds to the captured film image. The captured electronic image of the subject corresponding to the captured film image of the subject is displayed to permit one to verify they got the captured film image they wanted. The camera includes an optional-use self-timer used to delay film image and electronic image capture of the subject. When the self-timer is intended to be used, the camera electronically captures a preview image without capturing a film image of the subject, and displays the electronically captured preview image to determine whether the camera is correctly positioned to take a picture of the subject.

11 Claims, 6 Drawing Sheets

DUAL FILM IMAGE AND ELECTRONIC IMAGE CAPTURE CAMERA WITH SELF-TIMER

CROSS REFERENCE TO RELATED APPLICATION

Reference is made to commonly assigned copending application Ser. No. 09/494,012, entitled DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE and filed Jan. 28, 2000 in the name of Robert Hills and James W. Fulmer.

FIELD OF THE INVENTION

The invention relates generally to the field of photography, and in particular to a dual film image and electronic image capture camera with an optional-use self-timer.

BACKGROUND OF THE INVENTION

A shutter controls the time during which light is allowed to reach the sensitized material in a camera. The shutter consists of some means of normally covering the taking lens, the aperture stop or the film light-tight, uncovering it for a brief time and then covering it up again. As is known, a self-timer is a delayed action release for the shutter. The self-timer, when set, delays operation of the shutter for a predetermined time. This, for example, gives a person the opportunity to place himself in front of the camera in order to be photographed.

Recently, a dual image camera has been proposed for substantially simultaneously capturing a film image of a subject being photographed and an electronic image of the subject. The camera includes an image display that shows a captured electronic image of the subject which corresponds to a captured film image of the subject. The displayed electronic image permits one to verify they got the captured film image they wanted. The camera does not include a self-timer.

The Cross-Referenced Application

The cross-referenced application Ser. No. 09/494,012, entitled DUAL FILM EXPOSURE, ELECTRONIC EXPOSURE CAMERA WITH ELECTRONIC INFORMATION EDITING AFTER EACH EXPOSURE AND INFORMATION RECORDING ON FILM AFTER COMPLETED EXPOSURE discloses a dual film image and electronic image capture camera that is capable of electronic information editing after each substantially simultaneous film and electronic exposure, and that magnetically records the information adjacent each one of the exposed film frames after completed exposure of the entire film length.

SUMMARY OF THE INVENTION

According to one aspect of the invention, a camera for substantially simultaneously capturing a film image of a subject being photographed and an electronic image of the subject, which includes a display that shows a captured electronic image of the subject corresponding to a captured film image of the subject to permit one to verify they got the captured film image they wanted, is characterized in that:

an optional-use self-timer is used to delay film image and electronic image capture of the subject; and a control connected to the display and to the self-timer causes a preview electronic image to be shown in the display before film image capture of the subject can occur, only when the self-timer is to be used. The preview electronic image shown in the display can be used to determine whether the camera is correctly positioned for picture-taking. Preferably, the control provides an indication that there is no film image capture of the subject when the display shows the preview electronic image.

According to another aspect of the invention, an image display method for a camera that substantially simultaneously captures a film image of a subject being photographed and an electronic image of the subject corresponding to the captured film image, and that includes an optional-use self-timer used to delay film image and electronic image capture of the subject, comprises the steps of:

electronically capturing a preview image without film image capture of the subject and displaying the electronically captured preview image, only when the self-timer is to be used; and electronically capturing an image of the subject corresponding to a captured film image of the subject and displaying the captured electronic image, regardless of whether the self-timer has been used.

DETAILED DESCRIPTION OF THE INVENTION

The invention is disclosed as being embodied preferably in a motorized film advance camera for substantially simultaneously capturing a film image of a subject being photographed and an electronic image of the subject. Because the features of a motorized film advance camera are generally known, the description which follows is directed in particular only to those elements forming part of or cooperating directly with the disclosed embodiment. It is to be understood, however, that other elements may take various forms known to a person of ordinary skill in the art.

Figure 1:
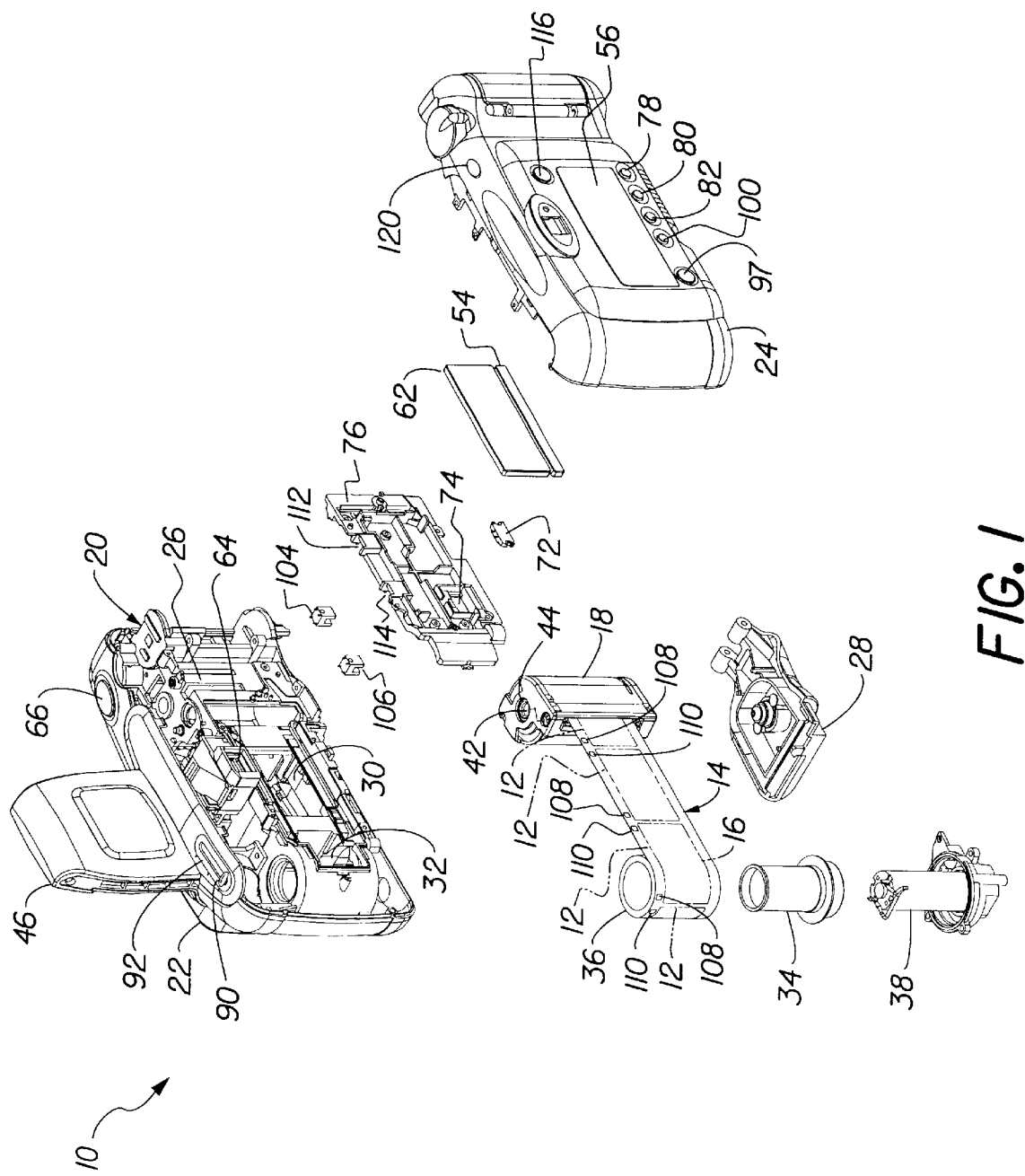
FIG. 1 is a rear exploded perspective view of a dual film exposure, electronic exposure camera that is a preferred embodiment of the invention.
Figure 2:
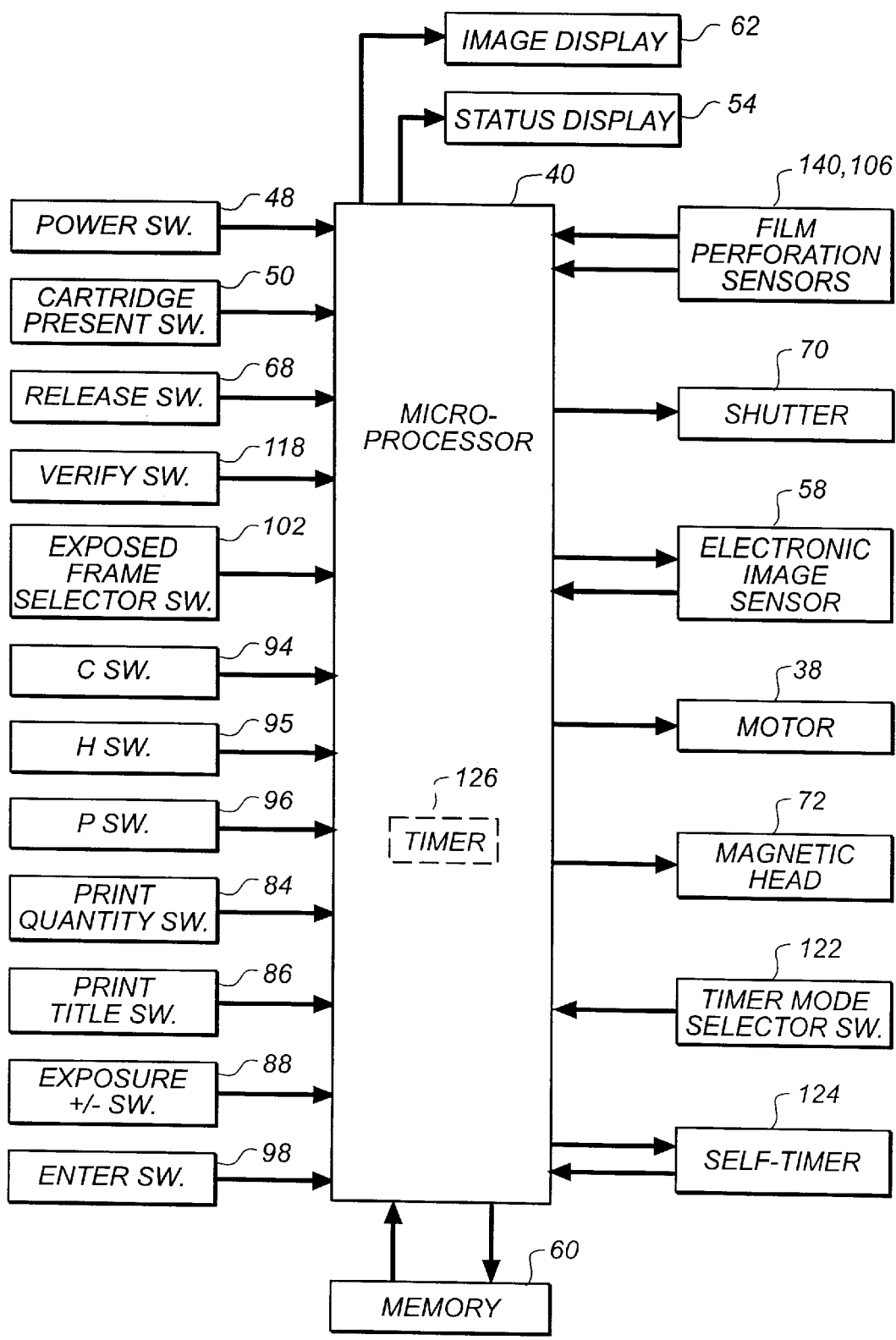
FIG. 2 is a block diagram of various components of the camera.

Referring now to the drawings, FIGS. 1 and 2 show a motorized film advance camera 10 for exposing latent images, i.e. captured film images of the subject being photographed, on successive frames 12 of a known "Advanced Photo System" ("APS") filmstrip 14. The filmstrip 14 has a transparent magnetic overlay which gives it magnetic recording capacity to store various user-selected information along a track 16 adjacent each exposed film frame 12, and it is normally housed in an opaque film cartridge 18. Typically, the filmstrip 14 is available in 15-exposure, 25-exposure, and 40-exposure lengths, and the user-selected information can differ from frame-to-frame.

The camera 10 has an opaque main body part 20 that is housed between a pair of connected opaque front and rear cover parts 22 and 24. See FIG. 1. The main body part 20 has a cartridge receiving chamber 26 for receiving the film cartridge 18 through a bottom opening (not shown) when a bottom door 28 is pivoted open, a rearwardly open backframe opening 30 at which the respective frames 12 of the filmstrip 14 are temporarily positioned one at a time to be exposed, and an exposed film take-up chamber 32 that contains a film take-up spool 34. The film take-up spool 34 is incrementally rotated following each film exposure, i.e. film image capture of the subject, to wind the most-recently exposed one of the film frames 12 onto an exposed film roll 36 on the spool and to position a fresh unexposed film frame at the backframe opening 30. When the film take-up spool 34 is incrementally rotated, the filmstrip 14 is advanced forward one frame increment which is slightly greater than a frame width. A drive motor 38 resides inside the film take-up spool 34 for incrementally rotating the spool to advance the filmstrip 14 forward one frame increment, and its operation is controlled by a known microcomputer 40. When substantially the entire length of the filmstrip 14 is exposed, i.e. the total number of available frames 12 are exposed, a spindle (not shown) which projects into a cavity 42 in a top end 44 of a film spool inside the film cartridge 18 is continuously rotated via the motor 38 and a suitable gear train (not shown) to rewind the exposed film length rearward into the cartridge.

To magnetically record the user-selected information along the track 16 adjacent each exposed film frame 12, the motor 38 must be actuated after the exposed film length is rewound rearward into the film cartridge 18 to continuously rotate the film take-up spool 34 in order to advance the exposed film length forward. Then, the motor 38 is actuated after the information recording to continuously rotate the film spool inside the film cartridge 18 in order to rewind the film length with the recorded information rearward into the cartridge. Finally, the door 28 is pivoted open to remove the film cartridge 18 from the cartridge receiving chamber 26.

A known electronic flash unit 46 for flash assisted exposures is flipped up from partially covering the front cover part 22 to uncover a taking lens (not shown) preparatory to using the camera 10. See FIG. 1. Flipping up the flash unit 46 closes a normally open power switch 48 connected to the microcomputer 40 to electrically power "on" the camera 10. See FIG. 2.

Figure 3:
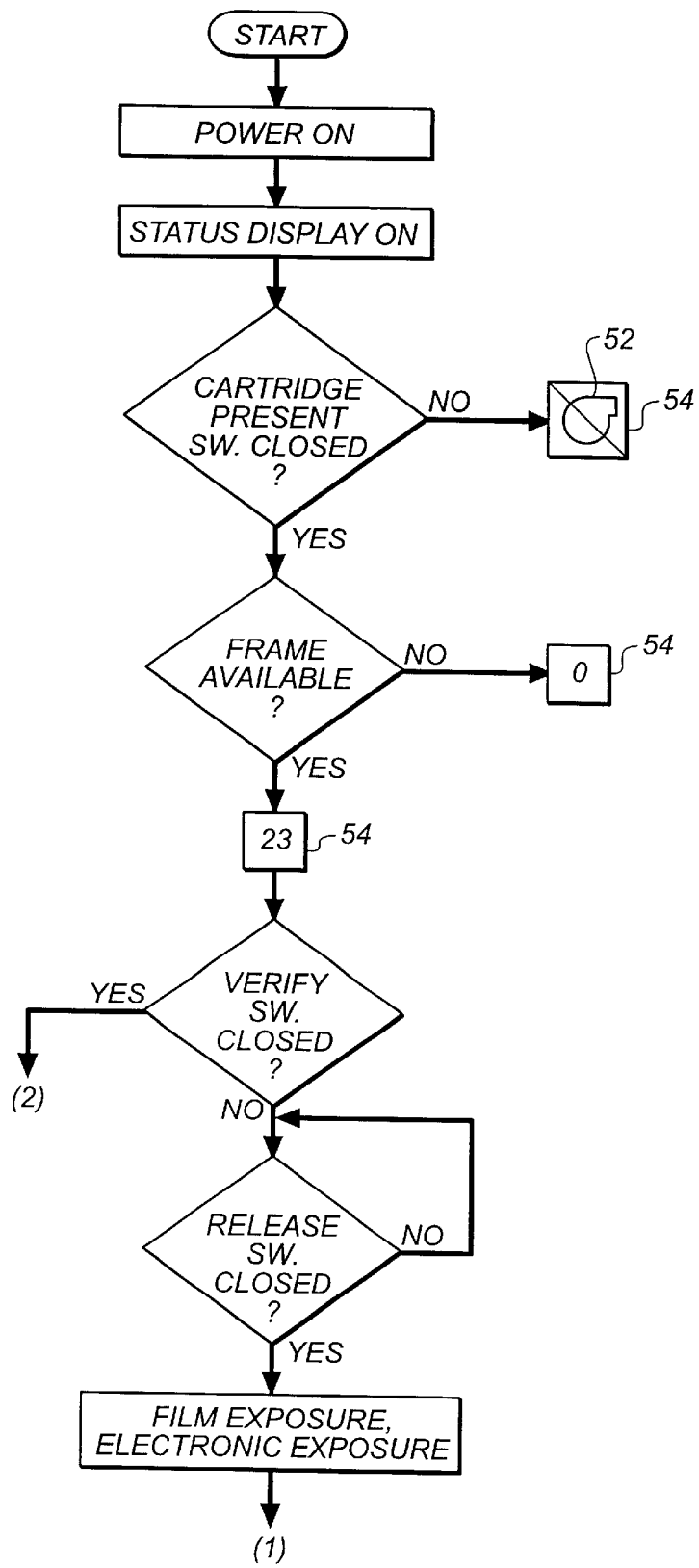
FIGS. 3, 4, 5 and 6 is a flow chart depicting operation of the camera to illustrate the invention.

A normally open cartridge present switch 50 in the cartridge receiving chamber 26 and connected to the microcomputer 40 is closed when the film cartridge 18 is present in the chamber and the door 28 is closed. See FIG. 2. If the camera 10 is powered "on" and the cartridge present switch 50 is open, a visible no-cartridge warning 52 shown in FIG. 3 is shown in a known status display 54 such as a black and white LCD connected to the microcomputer 40. The status display 54 is turned "on" when the power switch 48 is closed, and is located behind a window 56 in the rear cover part 24. See FIG. 1. If the camera 10 is powered "on" and the cartridge present switch 50 is closed, a visible cartridge loaded indication (not shown) is shown in the status display 54

A known electronic image sensor 58, for example a CCD sensor with integrated shuttering capability or a CMOS sensor with integrated shuttering capability, is connected to the microcomputer 40 to form a different electronic image, i.e. electronic image capture of the subject, each time one of the unexposed film frames 12 is exposed. The respective electronic images correspond to the latent images on the exposed film frames 12, are each stored in a memory 60 connected to the microcomputer 40, and can be shown one at a time in a known image display 62 such as a color LCD connected to the microcomputer. The image display 62 is located next to the status display 54, behind the window 56 in the rear cover part 24. The memory 60 has storage capacity for storing at least 40 electronic images, since the filmstrip 14 is available in 15-exposure, 25-exposure, and 40-exposure lengths.

A viewfinder 64 for viewing the subject (before it is photographed) is located on the main body part 20. See FIG. 1.

To take a picture of the subject, a shutter release button 66 on the front cover part 22 is manually depressed which in turn closes a normally open release switch 68 connected to the microcomputer 40. See FIGS. 1 and 2. The closed switch 68 triggers momentary opening of a known normally closed shutter 70 to expose a latent image of the subject on the film frame 12 at the backframe opening 30, and to excite the electronic image sensor 58 to form an electronic image of the subject substantially simultaneously with exposure of the latent image. The taking lens (not shown) can be used to focus an image of the subject, for the electronic image sensor 58 as well as for the filmstrip 14, or a separate lens an be provided for the electronic image sensor. These alternatives are indicated in prior art U.S. Pat. No. 5,710,954 issued Jan. 20, 1998.

A magnetic head 72 is mounted within an opening 74 in a film pressure platen 76 for magnetically recording the user-selected information along the track 16 adjacent each one of the exposed film frames 12. The film pressure platen 76 serves to support each film frame 12 flat for exposure at the backframe opening 30.

The user-selected information can be a single selected print title (optional) in English and other languages, a single selected print exposure correction +/− (optional), at least one selected known "APS" print format "C" (classic) and/or "H" (HDTV) and/or "P" (panoramic), and at least one selected C- and/or H- and/or P- print quantity number preferably ranging from 0–9 prints (to indicate 1, 2, 3, 4, 5, 6, 7, 8, 9, or 0 prints), for each one of the exposed film frames 12. This allows "C" and/or "H" and/or "P" print formats to be selected for any one of the exposed film frames 12, and a corresponding C-, H- or P- print quantity number 0–9 to be selected for each one of the "C", "H" and "P" print formats that have been selected for the same exposed film frame. For example, for a particular one of the exposed film frames 12, the print quantity and print format selections can be two "C" format prints, one "H" format print, and no (zero) "P" format prints. Thus, the expression "and/or" between "C", "H" and "P" (as is known) means any one of (1) only "C", only "H" or only "P", (2) "C", "H" and "P", (3) "C" and "H", (4) "C" and "P", and (5) "H" and "P"-which constitute seven different available choices.

A print having a "C" format is typically 4×6 inches. A print having a "H" format is typically 4×7 inches. And a print having a "P" format is typically 4×10 inches or 4×11.5 inches. No matter which one(s) of the print formats is (are) selected, "C", and/or "H" and/or "P", the exposed frames 12 on the filmstrip 14 are always in the "H" format. As is known, this allows re-prints to be made in any of the three formats rather than just in the selected format.

The selected print title, print exposure correction, "C" and/or "H" and/or "P" print format(s), and C- and/or H- and/or P- print quantity number(s), for every one of the exposed film frames 12 are stored as corresponding designations or assignments in the memory 60 for the respective film frames. Individual visible indications of the selected print title, print exposure correction, and C- and/or H- and/or P- print quantity number(s), for any one of the exposed film frames 12 can be seen in the status display 54. Also, a visible indication of the selected "C" and/or "H" and/or "P" print format(s) for any one of the exposed film frames 12 can be seen in the image display 62 (preferably with the selected "C" and/or "H" and/or "P" print format(s) superimposed on the electronic image shown in the image display). When more than one of the "C", "H" and "P" print formats have been selected for any one of the exposed film frames 12, the visible indications of the selected print formats can be seen together, or alternatively they can be seen one at a time, in the image display 62.

Respective print quantity, title and exposure correction buttons 78, 80 and 82 are provided on the rear cover part 24, and when individually manually depressed one or more times close normally open print quantity, title and exposure correction switches 84, 86 and 88 the same number of times. See FIGS. 1 and 2. The print quantity, title and exposure correction switches 84, 86 and 88 are connected to the microcomputer 40 in order to input C- and/or H- and/or P- print quantity number(s), title and exposure correction as designations or assignments to the memory 60 for a most-recently exposed one of the film frames 12 and to change the C- and/or H- and/or P- print quantity number(s), title and exposure correction stored in the memory 60 for any one of the exposed film frames 12. A three-position print format selection button 90 is supported on a top plate 92 for manual movement into any one of three C-, H- and P- print format selection positions, and when manually depressed once in any one of the three positions closes a corresponding one of three normally open C, H and P switches 94, 95 and 96 once. The C, H and P switches 94, 95 and 96 are individually connected to the microcomputer 40 in order to input "C" and/or "H" and/or "P" print format(s) as designations or assignments to the memory to the memory 60 for a most-recently exposed one of the film frames 12 and to change "C" and/or "H" and/or "P" print format(s) stored in the memory 60 for any one of the exposed film frames 12. To enter the newly selected information in the memory 60, an enter button 97 on the rear cover part 24 must be manually depressed which in turn closes a normally open enter switch 98 connected to the microcomputer 40.

The three-position print format selection button 90 remains in the last-used one of its three C-, H- and P- print format selection positions until such time as it is manually moved to another one of its three positions, i.e. the button does not default via a spring-urging to any one of the three positions. Although not shown, manual movement of the print format selection position button 90 to any one of its three C-, H- and P- print format selection positions can serve to adjust a known variable print format mask in the viewfinder 64 to view the subject to be photographed in a viewing format that matches the position of the button.

If the print quantity switch 84 is not closed one-to-ten times (to designate a print quantity number to be 1, 2, 3, 4, 5, 6, 7, 8, 9, or 0 prints) for a particular one of the selected "C", "H" or "P" print formats, a default print quantity number for that one selected print format is "1". The default print quantity number can be stored as such in the memory 60.

An exposed frame selector button 100 is provided on the rear cover part 24, and when manually depressed one or more times closes a normally open exposed frame selector switch 102 connected to the microcomputer 40 the same number of times, to change the electronic image and the "C", and/or "H" and/or "P" print format(s) shown in the image display 62 for any one of the exposed film frames 12, and to change the C- and/or H- and/or P- print quantity number(s), print title, and print exposure correction shown in the status display 54 for the same exposed film frame, to the electronic image and the user-selected information for another one of the exposed film frames. This is possible because the electronic images that match the exposed film frames, and the user-selected information for the exposed film frames, are stored in the memory 60. Thus, one can effectively scroll through the electronic images and the user-selected information stored in the memory 60 for the exposed film frames 12, and successively see the electronic images and the user-selected information for any one of the exposed film frames in the status and image displays 54 and 62. This is done in preparation for manually depressing the print quantity, title and exposure correction buttons 78, 80 and 82 and the print format selection button 90 to change the user-selected information stored in the memory 60 for any one of the exposed film frames 12.

A pair of identical film perforation sensors 104 and 106 for sensing successive pairs of film perforations 108 and 110 in the filmstrip 14 are mounted in respective pockets 112 and 114 in the film pressure platen 76 and are connected to the microcomputer 40. The film perforation sensors 104 and 106, as is known, are used via the microcomputer 40 to decrement a frame count (the number of available film frames 12) stored in the memory 60 by "1", each time the filmstrip 14 is advanced forward a frame increment and the most-recently exposed one of the film frames is wound onto the exposed film roll 36 on the film take-up spool 34. The frame count begins with "15", "25" or "40" depending whether the filmstrip 40 has a 15-exposure, 25-exposure, or 40-exposure length.

A verify (print preview) button 116 is provided on the rear cover part 24, and when manually depressed closes a normally open verify switch 118 connected to the microcomputer 40. See FIGS. 1 and 2. The closed verify switch 118 causes the electronic image and the "C" and/or "H" and/or "P" print format(s) stored in the memory 60 for the most-recently exposed one of the film frames 12 to be shown in the image display 62, and it causes the C- and/or H- and/or P- print quantity number(s), print title, and print exposure correction stored in the memory for the same exposed film frame to be shown in the status display 54. If, however the exposed frame selector switch 102 had been closed to change the electronic image and the "C" and/or "H" and/or "P" print format(s) shown in the image display 62 and to change C- and/or H- and/or P- the print quantity number(s), print title, and print exposure correction shown in the status display 54, from that for the most-recently exposed one of the film frames to that for an earlier exposed one of the film frames, then the closed verify switch 118 causes the electronic image and the user-selected information for the earlier exposed film frame to be shown in the displays.

A timer mode selector button 120 is provided on the rear cover part 24, and when manually depressed closes a normally open timer mode selector switch 122 connected to the microcomputer 40. See FIGS. 1 and 2. The timer mode selector button 120 is manually depressed when one intends to use a known built-in optional-use self timer 124 connected to the microcomputer 40. Normally, when one manually depresses the shutter release button 66 to take a picture of the subject, the closed release switch 68 triggers momentary opening of the shutter 70 to expose a latent image of the subject on the film frame 12 at the backframe opening 30, and to excite the electronic image sensor 58 to form an electronic image of the subject substantially simultaneously with exposure of the latent image. However, the self-timer 124 is connected to the microcomputer 40 to begin a predetermined time delay, e.g. 10 seconds, in order to temporarily put off this film image and electronic image capture of the subject, when the shutter release button 66 is manually depressed following manual depression of the timer mode selector button 120. After the elapse of the predetermined time delay, the self-timer 124 triggers the film image and electronic image capture. Thus, the self-timer 122 gives one the opportunity to place himself in front of the camera 10 before the film image and electronic image capture can occur.

When the timer mode selector button 120 is manually depressed because one intends to use the self-timer 124, but the shutter release button 66 is not yet manually depressed to take a picture of the subject, the electronic image sensor 58 is excited to form an electronic preview or "set-up" image, which then is shown in the image display 62. The electronic capture of the preview image occurs without any occurrence of film image capture, and the preview image when viewed in the image display 62 allows one to determine whether the camera 10 is correctly positioned before taking the picture using the self-timer 124.

The three-position print format selection button 90 can be manually moved into any one of its C-, H- and P- print format selection positions, and when manually depressed in any one of the three positions closes a corresponding one of the C, H and P switches 94, 95 and 96 to superimpose the selected "C" and/or "H" and/or "P" print format(s) on the electronically captured preview image shown in the image display 62. This further helps one to determine whether the camera 10 is correctly positioned before taking the picture using the self-timer 124. When the shutter release button 120 is subsequently depressed to take the picture, the image display 62 is turned "off".

Operation

A. Non-Self-Timer Mode (FIGS. 3–5)

Figure 4:
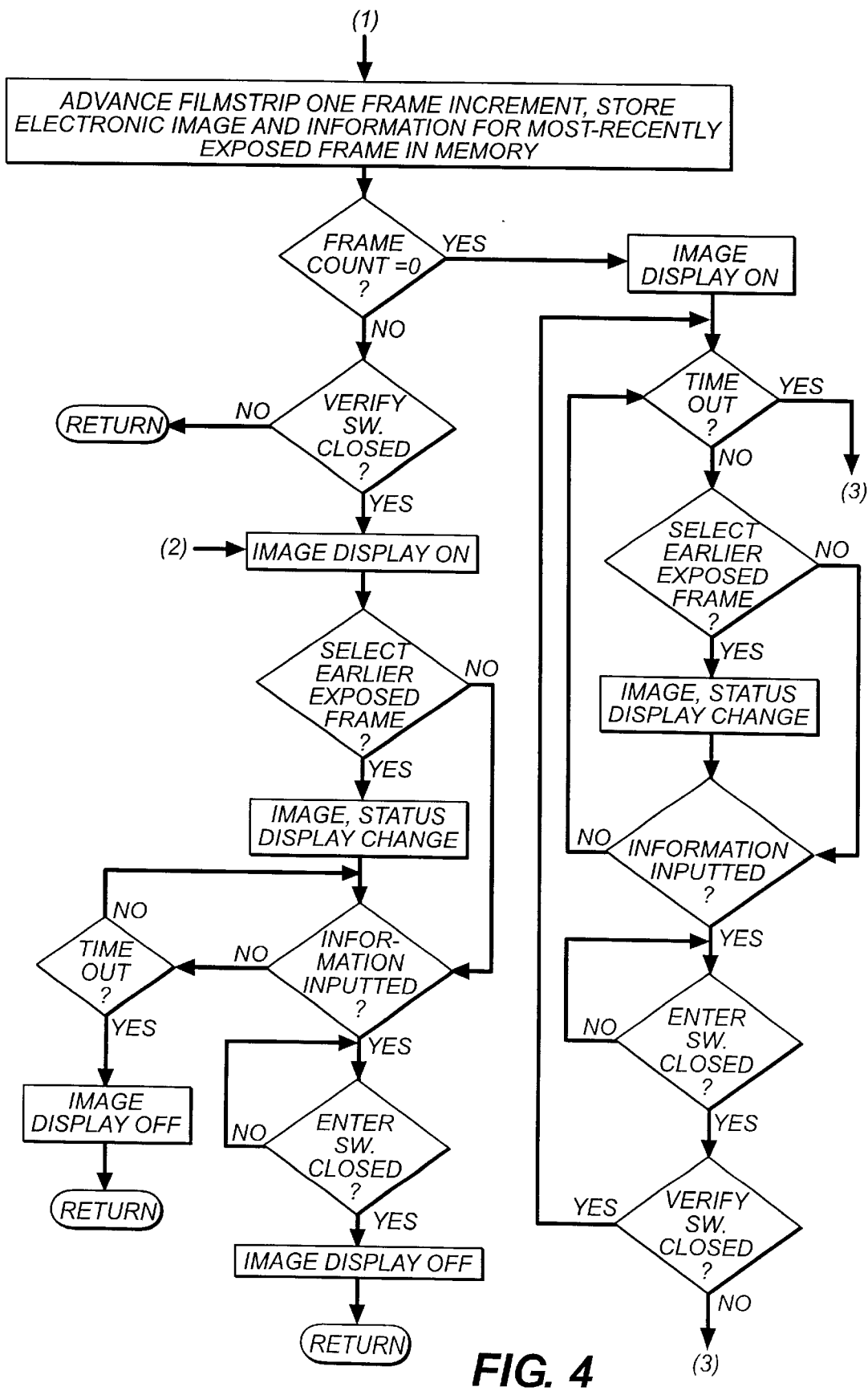
Figure 5:
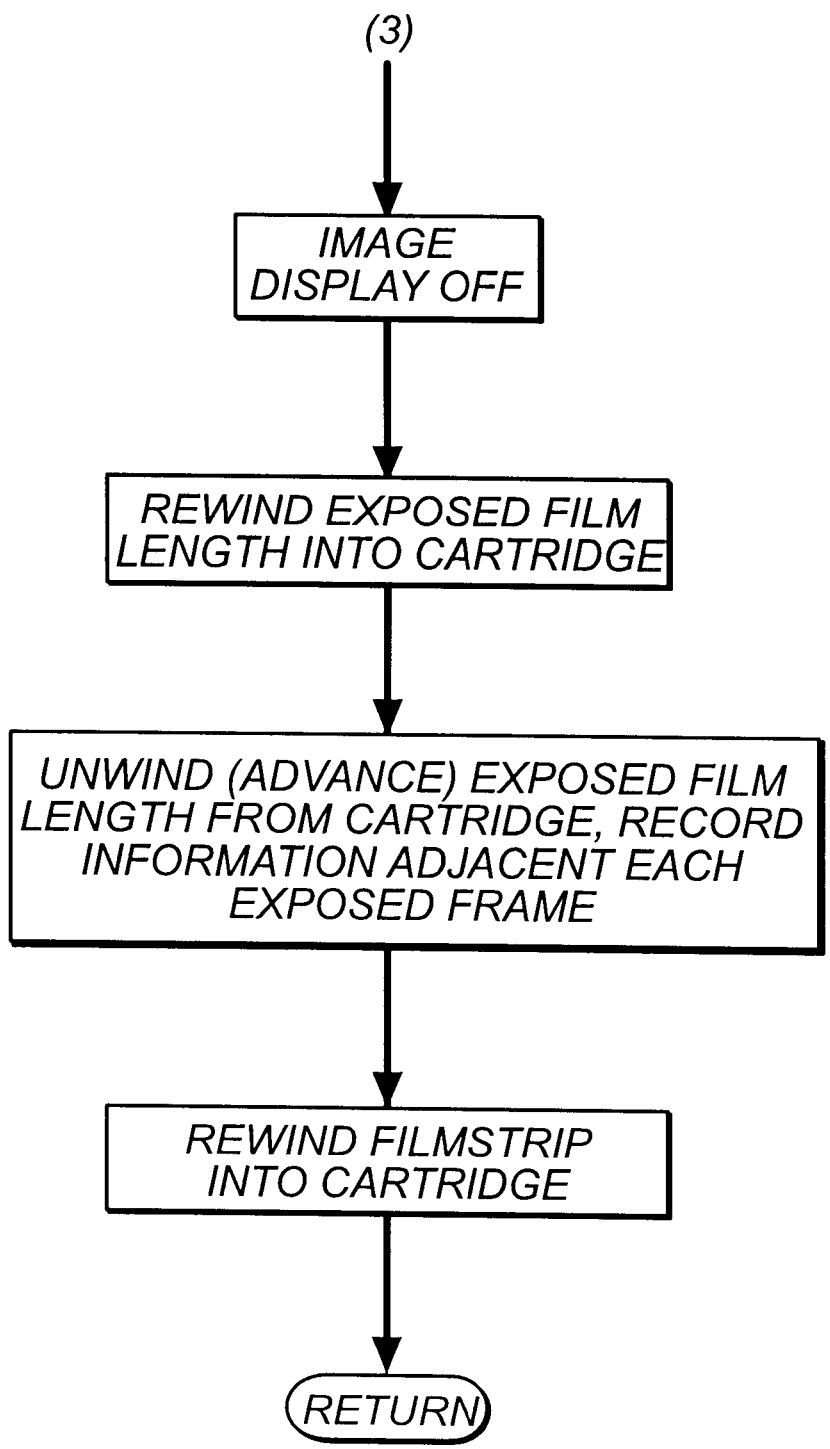

The operation of the camera 10 without the optional-use self-timer 124 is shown in a flow chart in FIGS. 3–5.

1. Starting at FIG. 3, when the camera 10 is electrically powered "on" by flipping up the electronic flash unit 46, the status display 54 is simultaneously turned "on." The status display 54 shows, among other things, the frame count (the number of available film frames 12) stored in the memory 60.

2. If then in FIG. 3 the cartridge present switch 50 remains open because no film cartridge 18 is present in the cartridge receiving chamber 26, the no-cartridge warning 52 is provided in the status display 54.

3. If conversely in FIG. 3 the cartridge present switch 50 is closed because the film cartridge 18 is present in the cartridge receiving chamber 26, the memory 60 is interrogated to determine whether the frame count is greater than "0".

4. If then in FIG. 3 the frame count in the memory 60 is "0", which indicates that the final available one of the film frames 12 has been exposed, i.e. there are no film frames remaining for exposure, the number "0" appears in the status indicator 54.

5. If conversely in FIG. 3 the frame count in the memory 60 is greater than "0", for example "23", which indicates that there are twenty-three film frames 12 available for exposure, the number "23" appears in the status indicator 54.

6. If next in FIG. 3 the verify switch 118 is closed, the image display 62 is turned "on" in FIG. 4 to show the electronic image stored in the memory 60 corresponding to the latent image on the most-recently exposed one (or alternatively an earlier exposed one) of the film frames 12. Also, the status display 54 now shows the user-selected information stored in the memory 60 for the same exposed film frame, except that the visible indication of the selected "C" and/or "H" and/or "P" print format(s) for that exposed film frame is shown in the image display 62 superimposed on the electronic image.

7. If conversely in FIG. 3, the verify switch 118 remains open, and the release switch 68 is not closed within an allotted time, e.g. 150 seconds, determined by a timer 126 in the microcomputer 40, the camera 10 is powered "off" for battery conservation.

8. If conversely in FIG. 3, the verify switch 118 remains open, and the release switch 68 is closed within the allotted time, e.g. 150 seconds, determined by the timer 126 in the microcomputer 40, because a picture of the subject is being taken, a latent image of the subject is exposed on the film frame 12 at the backframe opening 30 and the electronic image sensor 58 is excited to form an electronic image of the subject which matches the latent image on the newly exposed frame.

9. Then in FIG. 4 the motor 38 is actuated to incrementally rotate the film take-up spool 34 in order to advance the filmstrip 14 forward a frame increment and wind the most-recently exposed one of the film frames 12 onto the exposed film roll 36 on the spool. Also, the electronic image corresponding to the latent image on the most-recently exposed frame 12 and the user-selected information for the most-recently exposed frame are stored in the memory 60, and the frame count stored in the memory is decremented by "1", for example to "22."

10. If next in FIG. 4 the frame count in the memory 60 is greater than "0", the verify switch 114 can be closed.

11. If then in FIG. 4 the verify switch 118 is not closed within the allotted time, e.g. 150 seconds, determined by the timer 126 in the microcomputer 40, or alternatively the release switch 68 is not closed within the same time, the camera 10 is powered "off" for battery conservation.

12. If conversely in FIG. 4 the verify switch 118 is closed within the allotted time (as in FIG. 3), e.g. 150 seconds, determined by the timer 126 in the microcomputer 40, the image display 62 is turned "on" to show the electronic image stored in the memory 60 corresponding to the latent image on the most-recently exposed one (or alternatively an earlier exposed one) of the film frames 12. Also, the status display 54 now shows the user-selected information for the same exposed film frame, except that the visible indication of the selected "C" and/or "H" and/or "P" print format(s) is shown in the image display 62 superimposed on the electronic image.

13. If next in FIG. 4 the exposed frame selector switch 102 is not closed within the allotted time, e.g. 150 seconds, determined by a timer 126 in the microcomputer 40, and none of the user-selected information switches 84, 86, 88 and 94–96 are closed within a brief time, e.g. 10 seconds, determined by the timer, the image display 62 is turned "off". The camera 10 including the status display 54 remains "on."

14. If conversely in FIG. 4 the exposed frame selector switch 102 is not closed within the allotted time, e.g. 150 seconds, determined by the timer 126 in the microcomputer 40, and at least one of the user-selected information switches 84, 86, 88 and 94–96 is closed within the brief time, e.g. 10 seconds, determined by the timer, then when the enter switch 98 is closed, the image display 62 is turned "off", and the electronic image and the new selected information for the most-recently exposed one of the film frames 12 are stored in the memory 60 in place of the previously stored information for the same exposed film frame.

15. If alternatively in FIG. 4 the exposed frame selector switch 102 is closed within the allotted time, e.g. 150 seconds, the electronic image and the user-selected information stored in the memory 60 for any one of the earlier exposed film frames (not the most-recently exposed film frame) are shown in the status and image displays 54 and 62 in place of the previously shown image and information for another one of the exposed film frames. Then, when at least one of the user-selected information switches 84, 86, 88 and 94–96 is closed within the brief time, e.g. 10 seconds, and the enter switch 98 is closed, the image display 62 is turned "off", and the electronic image and the new selected information for the earlier exposed film frame 12 are stored in the memory 60 in place of the previously stored information for the same exposed film frame.

16. If in FIG. 4 the frame count in the memory 60 is "0", the image display 62 is turned "on" to show the electronic image stored in the memory 60 corresponding to the latent image on the final exposed one of the film frames 12. Also, the status display 54 now shows the user-selected information for the same exposed film frame, except that the visible indication of the selected "C" and/or "H" and/or "P" print format(s) is shown in the image display 62 superimposed on the electronic image. The image display 62 is turned "on" in this instance (as compared with the other instance in FIG. 4 that it is turned "on") without having to first close the verify switch 118.

17. If next in FIG. 4, the unexposed frame selector switch 102 is not closed within the allotted time, e.g. 150 seconds, and none of the user-selected information switches 84, 86, 88 and 94–96 are closed within a brief time, e.g. 10 seconds, the image display is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18 from the cartridge receiving chamber 26.

18. If conversely in FIG. 4 the unexposed frame selector switch 102 is not closed within the allotted time, e.g. 150 seconds, and at least one of the user-selected information switches 84, 86, 88 and 94–96 is closed within the brief time, e.g. 10 seconds, the image display 62 remains "on." Then when the enter switch 98 is closed and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

19. If alternatively in FIG. 4 the unexposed frame selector switch 102 is closed within the allotted time, e.g. 150 seconds, the electronic image and the user-selected information stored in the memory 60 for any one of the earlier exposed film frames (not the most-recently exposed film frame) is shown in the status and image displays 54 and 62. Then, when at least one of the user-selected information switches 84, 86, 88 and 94–96 is closed within the brief time, e.g. 10 seconds, and the enter switch 98 is closed, and the verify switch 118 is not closed within the allotted time, e.g. 150 seconds, the image display 62 is turned "off" as indicated in FIG. 5, and the motor 38 is actuated to continuously rotate the film spool inside the film cartridge 18 in order to rewind the exposed film length rearward into the cartridge. Then, the motor 38 is actuated to continuously rotate the film take-up spool 34 in order to advance the exposed film length forward, and the magnetic head 72 magnetically records the user-selected information stored in the memory 60 for each exposed film frame on the exposed film length along the track 16 adjacent each exposed film frame. Then, the motor 38 is actuated to continuously rotate the film spool inside the film cartridge 18 in order to rewind the exposed film length rearward into the cartridge. Finally, the door 28 is pivoted open to remove the film cartridge 18.

20. If conversely in FIG. 4 the verify switch 118 is closed within the allotted time, e.g. 150 seconds, go back to step 17 above.

B. Self-Timer Mode (FIG. 6)

Figure 6:
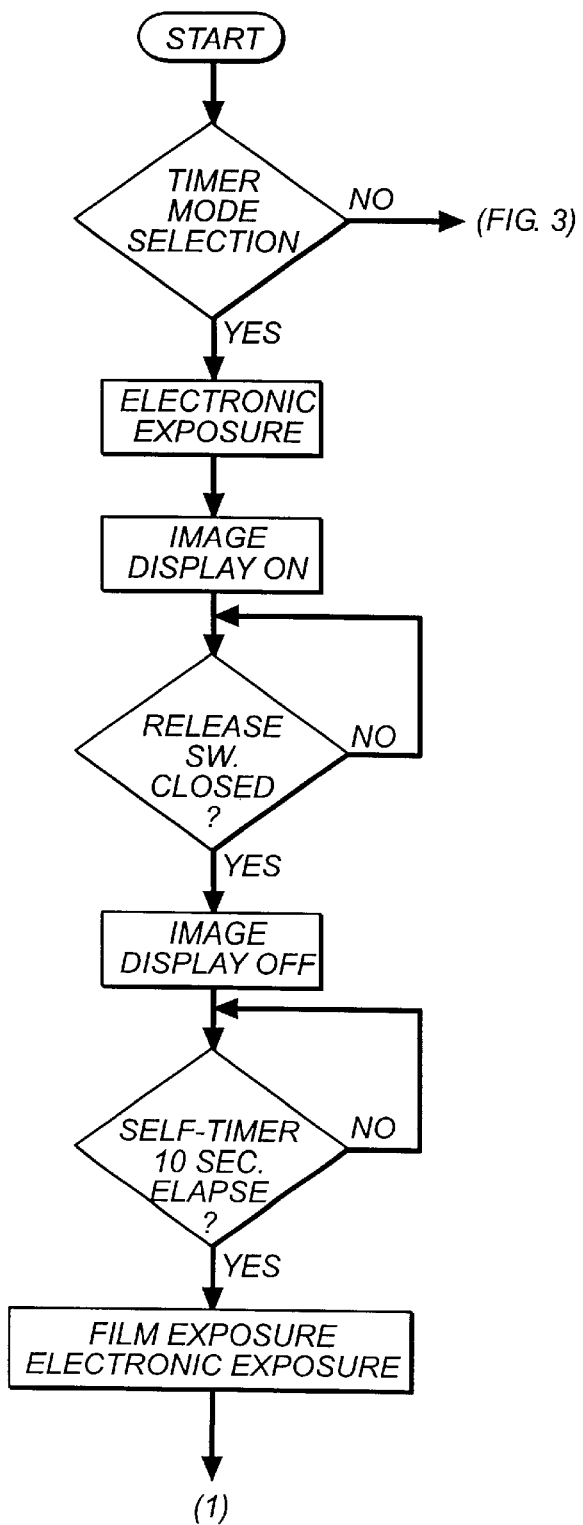

The operation of the camera 10 (to the extent not already described) with the optional-use self-timer 124 is shown in a flow chart in FIG. 6.

1. When the timer mode selector button 120 is manually depressed because one intends to use the self-timer 124, but the shutter release button 66 is not yet manually depressed to take a picture of the subject, the electronic image sensor 58 is excited to form an electronic preview image, which then is shown in the image display 62. The electronic capture of the preview image occurs without any occurrence of film image capture, and the preview image when viewed in the image display 62 allows one to determine whether the camera 10 is correctly positioned before taking the picture using the self-timer 124. Preferably, a reminder such as an icon or blinking warning that indicates there has not been any film image capture is shown in the image display 62, next to the displayed preview image.

2. The three-position print format selection button 90 can be manually moved into any one of its C-, H- and P- print format selection positions, and when manually depressed in any one of the three positions closes a corresponding one of the C, H and P switches 94, 95 and 96 to superimpose the selected "C" and/or "H" and/or "P" print format(s) on the electronically captured preview image shown in the image display 62. This further helps one to determine whether the camera 10 is correctly positioned before taking the picture using the self-timer 124.

3. If one determines that the camera 10 is not correctly positioned before taking the picture using the self-timer 124, he can repeat steps 1 and 3 above by repressing the timer mode selector button 120.

4. If one decides not to use the self-timer 124, the camera 10 must be powered "off".

5. When the camera 10 is correctly positioned to take the picture using the self-timer 124, the shutter release button 120 is manually depressed to turn "off" the image display 62. Then, after the predetermined time delay, e.g. 10 seconds, has elapsed, the self-timer 124 triggers momentary opening of the shutter 70 to expose a latent image of the subject on the film frame 12 at the backframe opening 30, and triggers exciting the electronic image sensor 58 to form an electronic image of the subject substantially simultaneously with exposure of the latent image.

The invention has been described with reference to a preferred embodiment. However, it will be appreciated that variations and modifications can be effected by a person of ordinary skill in the art without departing from the scope of the invention. For example, when in FIG. 4 the enter switch 98 is not closed within an allotted time, e.g. 150 seconds, determined by the timer 126 in the microcomputer 40, and alternatively the release switch 68 is not closed within the same time, the camera 10 could be powered "off" for battery conservation.

When in FIG. 6 the timer mode selector button 120 is manually depressed to excite the electronic image sensor 58 to form an electronic preview image, which then is shown in the image display 62, the electronic image sensor could have a "live" or "video" condition that would continuously or periodically re-excite the electronic image sensor to automatically update the preview image shown in the image display (without having to repress the timer mode selector button).

The image display 62 could be pivotally or removably mounted on the camera 10 to permit one to see the image display when facing the taking lens of the camera.

PARTS LIST 10. camera
12. film frames
14. filmstrip
16. track
18. film cartridge
20. main body part
22. front over part
24. rear cover part
26. cartridge receiving chamber
28. bottom door
30. backframe opening
32. exposed film take-up chamber
34. film take-up spool
36. exposed film roll
38. drive motor
40. microcomputer
42. spool cavity
44. spoolend
46. electronic flash unit
48. power switch
50. cartridge present switch
52. no-cartridge warning
54. status display
56. window
58. electronic image sensor
60. memory
62. image display
64. viewfinder
66. shutter release button
68. release switch
70. shutter
72. magnetic head
74. opening
76. film pressure platen
78. print quantity button
80. print title button
82. exposure correction button
84. print quantity switch
86. print title switch
88. exposure correction switch
90. format selection button
92. top plate
94. C switch
95. H switch
96. P switch
97. enter button
98. enter switch
100. exposed frame selector button
102. exposed frame selector switch
104. film perforation sensor
106. film perforation sensor
108. film perforation
110. film perforation
112. pocket
114. pocket
116. verify button
118. verify switch
120. timer mode selector button
122. timer mode selector switch
124. optional-use self-timer
126. timer

What is claimed is:

1. A camera for substantially simultaneously capturing a film image of a subject being photographed and an electronic image of the subject, which includes a display that shows a captured electronic image of the subject corresponding to a captured film image of the subject to permit one to verify they got the captured film image they wanted, is characterized in that:

an optional-use self-timer is used to delay film image and electronic image capture of the subject; and a control connected to said display and to said self-timer causes a preview electronic image to be shown in said display before film image capture of the subject can occur, only when said self-timer is to be used.

2. A camera as recited in claim 1, wherein said control provides an indication that there is no film image capture of the subject when said display shows said preview electronic image.

3. A camera for substantially simultaneously capturing a film image of a subject being photographed and an electronic image of the subject, which includes a display that shows a captured electronic image of the subject corresponding to a captured film image of the subject to permit one to verify they got the captured film image they wanted, is characterized in that:

an optional-use self-timer is used to delay film image and electronic image capture of the subject;

a timer mode selector is manually operated when said self-timer is intended to be used; and a control connected to said display and to said self-timer and said timer mode selector causes a preview electronic image to be shown in said display before film image capture of the subject can occur, when said timer mode selector is manually operated, and allows a captured electronic image of the subject corresponding to a captured film image of the subject to be shown in said display, regardless of whether said timer mode selector has been manually operated.

4. An image display method for a camera that substantially simultaneously captures a film image of a subject being photographed and an electronic image of the subject corresponding to the captured film image, and that includes an optional-use self-timer used to delay film image and electronic image capture of the subject, said method comprising the step of:

displaying a preview electronic image before there is film image capture of the subject, only when the self-timer is to be used to delay film image and electronic image capture of the subject.

5. An image display method for a camera that substantially simultaneously captures a film image of a subject being photographed and an electronic image of the subject corresponding to the captured film image, and that includes an optional-use self-timer used to delay film image and electronic image capture of the subject, said method comprising the steps of:

displaying a preview electronic image before there is film image capture of the subject, when the self-timer is to be used to delay film image and electronic image capture of the subject; and displaying a captured electronic image of the subject corresponding to a captured film image of the subject, regardless of whether the self-timer has been used to delay film image and electronic image capture of the subject.

6. A camera for substantially simultaneously capturing a film image of a subject being photographed and an electronic image of the subject, which includes a display that shows a captured electronic image of the subject corresponding to a captured film image of the subject and a shutter release that is manually operated to trigger film image and electronic image capture of the subject, is characterized in that:

an optional-use self-timer begins a predetermined time delay, and after the elapse of said predetermined time delay triggers film image and electronic image capture of the subject;

a timer mode selector is manually operated when said self-timer is intended to be used;

said shutter release, when manually operated without said timer mode selector having been manually operated, immediately triggers film image and electronic image capture of the subject, and when manually operated with said timer mode selector having been manually operated, causes said self-timer to trigger film image and electronic image capture of the subject after said predetermined time delay has elapsed; and a control initiates electronic image capture without film image capture of the subject to allow a preview electronic image to be shown in said display, only when said timer mode selector is manually operated, and initiates film image and electronic image capture of the subject to allow a captured electronic image of the subject corresponding to a captured film image of the subject to be shown in said display, both when said shutter release is manually operated without said timer mode selector having been manually operated and when said self-timer triggers film and image capture of the subject.

7. A camera as recited in claim 6, wherein said display shows an indication that there is no film image capture of the subject when said display shows said preview electronic image.

8. An image display method for a camera that substantially simultaneously captures a film image of a subject being photographed and an electronic image of the subject corresponding to the captured film image, and that includes an optional-use self-timer used to delay film image and electronic image capture of the subject, said method comprising the steps of:

electronically capturing a preview image without film image capture of the subject and displaying the electronically captured preview image, only when the self-timer is to be used; and electronically capturing an image of the subject corresponding to a captured film image of the subject and displaying the captured electronic image, regardless of whether the self-timer has been used.

9. An image display method as recited in claim 8, further having the step of replacing display of the electronically captured image that is the preview image with display of the electronically captured image that is the electronic image of the subject corresponding to the captured film image of the subject.

10. An image display method as recited in claim 8, further having the step of displaying an indication that there is no film image capture of the subject when the electronically captured preview image is displayed.

11. An image display method for a camera that substantially simultaneously captures a film image of a subject being photographed and an electronic image of the subject corresponding to the captured film image, and that includes an optional-use self-timer used to trigger film image and electronic image capture of the subject after the elapse of a predetermined time delay, said method comprising the steps of:

electronically capturing a preview image at least once without capturing a film image and displaying the electronically captured preview image; and electronically capturing an image of the subject corresponding to a captured film image of the subject and displaying the captured electronic image, when the self-timer triggers film image and electronic image capture of the subject.

* * * * *